Figure 7:
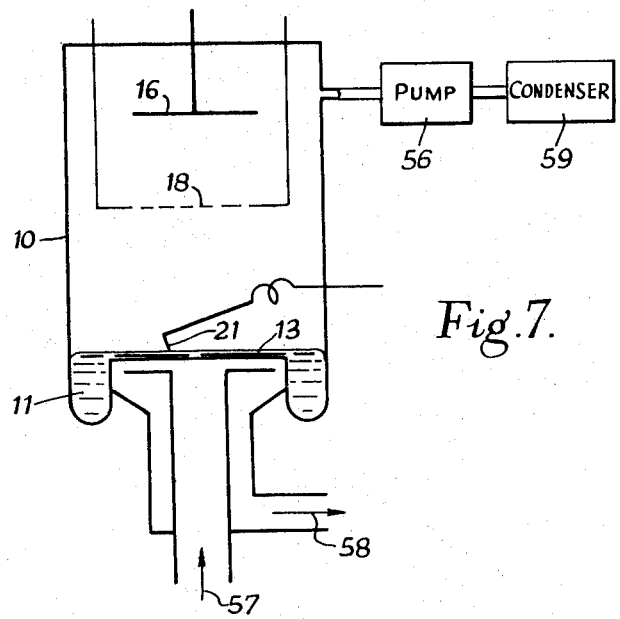

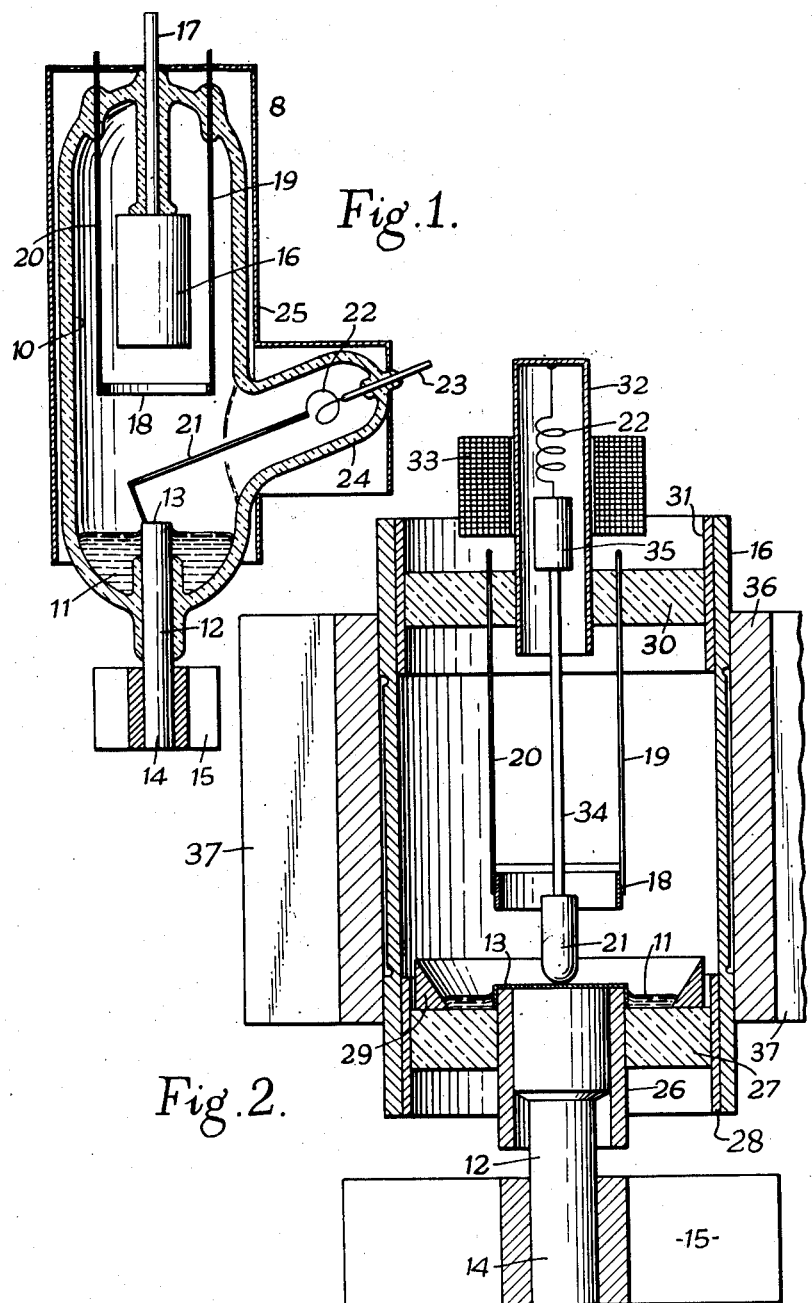

April 16, 1963     H. C. BERTELE     3,086,135
MERCURY-VAPOUR ELECTRIC DISCHARGE APPARATUS
Filed Aug. 15, 1960     8 Sheets-Sheet 2
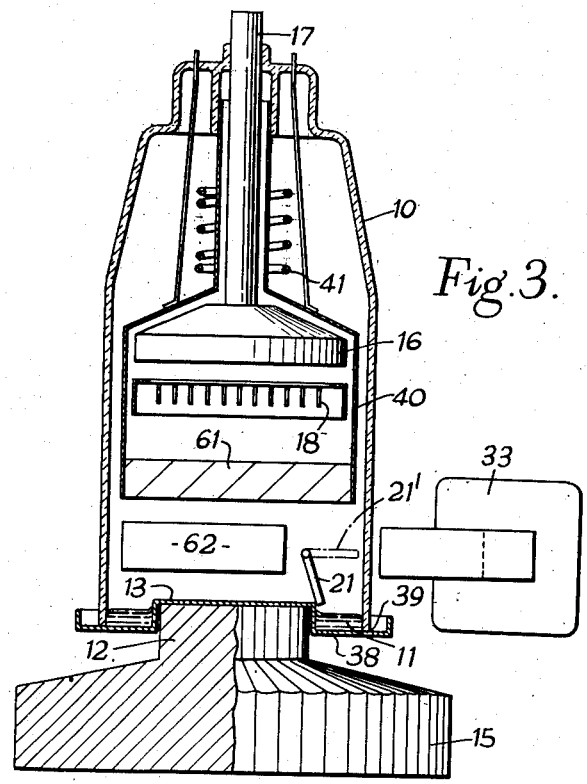
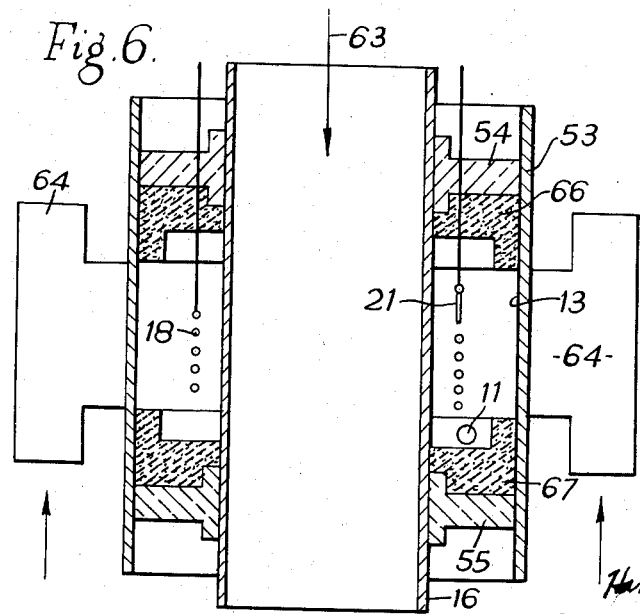
INVENTOR
Hans C. Bertele
BY
Kenyon, Palmer + Stewart
ATTORNEY

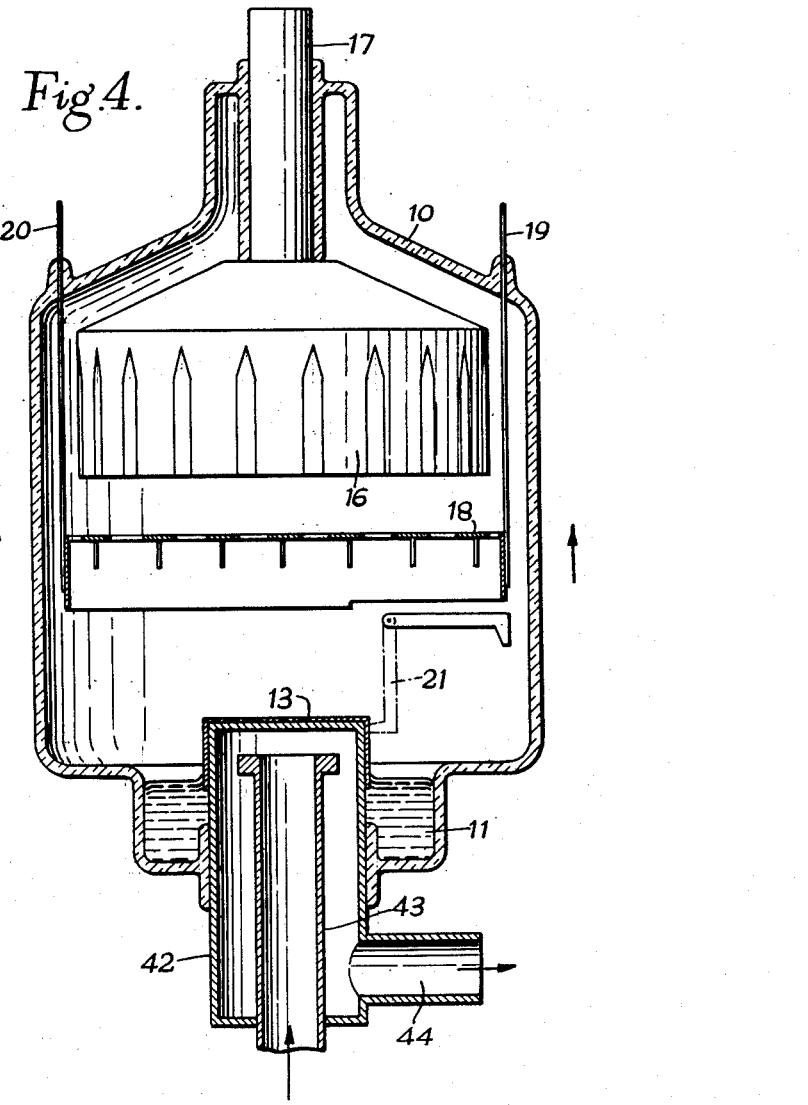

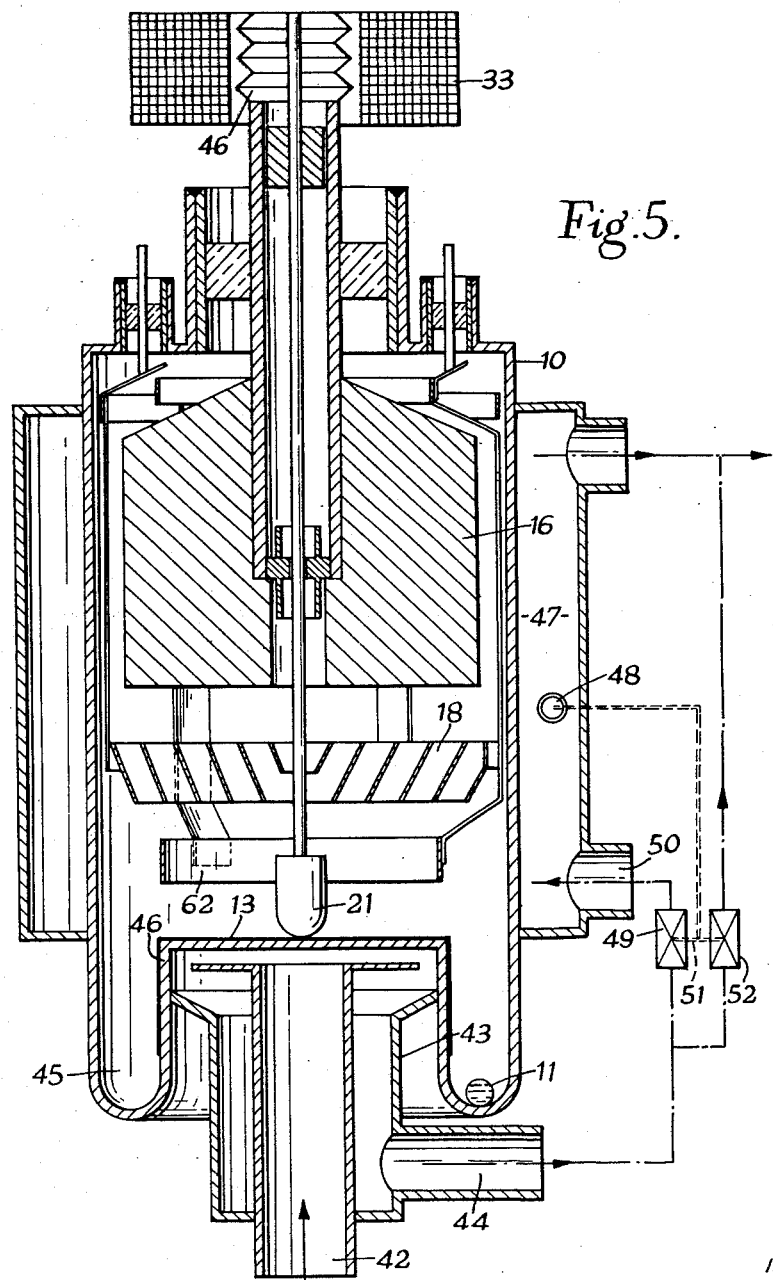

April 16, 1963 H. C. BERTELE 3,086,135
MERCURY-VAPOUR ELECTRIC DISCHARGE APPARATUS
Filed Aug. 15, 1960 8 Sheets-Sheet 8

INVENTOR
Hans C. Bertele
BY
Kenyon, Palmer + Stewart
ATTORNEY

United States Patent Office 3,086,135
Patented Apr. 16, 1963

3,086,135
MERCURY-VAPOUR ELECTRIC DISCHARGE
APPARATUS
Hans Carl Bertele, 6 Warren Road, Purley,
Surrey, England
Filed Aug. 15, 1960, Ser. No. 49,709
Claims priority, application Great Britain June 5, 1952
22 Claims. (Cl. 313—29)

The present application is a continuation-in-part of my application Serial No. 357,073, filed May 25, 1953, and is concerned with an invention relating to mercury vapour electric discharge apparatus of the type comprising an envelope enclosing an anode and a cathode between which, in operation, an electric discharge takes place in an atmosphere containing mercury vapour provided by vaporisation from a reservoir of liquid mercury within the envelope.

Such apparatus has been in use for many years for rectification of alternating current, and in a conventional form the cathode is provided by a pool of liquid mercury and the discharge takes place between the pool and the anode. The discharge takes place from only a small part of the surface of the pool, which part is usually referred to as the cathode spot. The area of the cathode spot is dependent upon the current carried and the current density over the spot is of the order of 4,000 amps. per square centimetre. The heat generated at the cathode spot is therefore considerable and, as is well known, gives rise to copious emission of mercury vapour. The high pressure resulting from this emission of vapour causes the spot to move rapidly over the surface of the pool.

The emission of large quantities of vapour necessitates the use of large cooling surfaces on which the mercury vapour can condense and from which the condensed mercury runs back into the pool.

In addition the occurrence of random jets of mercury vapour from the cathode spot with considerable velocity necessitates the use of an indirect arc path between the cathode and the anode or anodes. This has the effect of increasing the voltage drop across the arc and hence of reducing the efficiency of the apparatus.

Even with modern air-cooled pumpless steel tank apparatus the electrically active volume of the apparatus, that is to say the volume through which the discharge takes place, is only about 20% of the total volume enclosed by the envelope.

Thus the copius emission of vapour from the cathode spot has an important bearing on the size of the envelope and hence upon the overall cost and dimensions of equipment embodying apparatus of this kind and has led to some restrictions in the use of mercury vapour electric discharge apparatus in applications where these considerations are important.

Over a long period attempts have been made to develop a cathode arrangement which does not give rise to copious emission of mercury vapour, and one important result of these endeavours has been the evolution of the mercury vapour diode rectifier and the mercury vapour triode utilising an oxide-coated electron-emissive cathode which is heated by means of a heater supplied from an external source of current. The advantages achieved by the elimination of evaporation of mercury from the cathode and of the associated jets of vapour are clearly demonstrated by the use of these oxide-coated types of cathodes.

Unfortunately, mercury vapour electric discharge apparatus employing oxide-coated cathodes suffers from the disadvantages that it is restricted to currents of only a few amps., it is incapable of withstanding overloads to the same extent as is possible in types using mercury pool cathodes, its life is limited by the life of the oxide-coated cathode, and a considerable time is required for warming up before it can be put into operation.

In attempts to stabilise the discharge in mercury vapour discharge apparatus employing a cathode of liquid mercury it has been proposed to employ a rod of arc-resisting metal projecting through the surface of a pool of mercury. Under the action of an electric discharge the mercury is able to wet the rod at the line of contact between the mercury and the rod whereby a concave meniscus is formed at the wetting line. Under conditions of relatively low discharge current the discharge can be anchored to the concave meniscus. In a development of this technique using a spiral of molybdenum strip it has been possible to achieve anchoring up to a current of about 100 amps. in the discharge. Thus the application of this technique is limited to apparatus of small current-carrying capacity. Furthermore, owing to the occasional occurrence of vapour jets the technique does not enable much reduction in the size of the envelope to be effected.

In another proposal the cathode member is of porous arc-resisting metal such as tantalum, tungsten or molybdenum as described in United States patent specifications No. 2,128,861 and 2,128,862. The cathode member acts as a wick and supplies mercury to its surface by capillarity, mercury evaporated from the surface of the wick by the heat of the cathode spot being replaced by mercury from the main pool passing through the wick.

In my British patent specification No. 670,416 there is described yet another development of this technique in which the cathode is formed by a pool of mercury and the cathode "spot" is in the form of a line extending around and anchored to the upper peripheral edge of the cathode pool by forming the pool container of an arc-resisting metal which is wetted by the liquid mercury to produce a concave meniscus edge whilst not being sputtered by ion bombardment under operating conditions. A short high-conductivity heat transfer path is provided through the arc-resisting metal of the container at the said peripheral edge and a heat dissipating surface is provided external to the pool container and in contact with a fluid cooling medium.

It has also been found possible by means of the invention set forth in patent specification No. 670,416 to reduce considerably the size of the envelope relatively to that used in previous apparatus because of the reduction of vaporisation of mercury compared with that occurring in previously known mercury vapour electric discharge apparatus. Because of the occasional occurrence of vapour jets, however, the volume of the envelope is larger than would be necessary if the vapour jets could be eliminated completely. The maximum current which can be handled by the apparatus is, however, again only about 100 amps. This restriction arises from the excessive heating of the walls of the cup when higher currents are passed. It then becomes difficult to maintain the cup sufficiently cool to ensure anchoring. The manufacture of cups of larger diameter to overcome this disadvantage is difficult and costly.

One object of the present invention is to provide improved mercury vapour electric discharge apparatus wherein vapour jets can be completely eliminated and hence the volume of the envelope reduced to a value smaller than in known apparatus of the type specified employing cathodes of liquid mercury.

A further object of the invention is to provide improved mercury vapour electric discharge apparatus employing a mercury cathode wherein the quantity of mercury needed in the reservoir is considerably less than in known mercury vapour electric discharge apparatus employing mercury cathodes.

Yet another object of the invention is to provide an improved method of manufacturing a cathode for use in mercury vapour electric discharge apparatus, and to provide improved apparatus embodying the improved cathode.

Still another object is to provide a method of generating a novel discharge in a mercury vapour atmosphere.

The present invention is based upon the discoveries (a) That under the influence of an electric discharge a substantial area, and if required, the whole surface, of a solid member of arc-resisting metal such as molybdenum or tungsten within the envelope, can be provided with a thin film of mercury;

(b) If an electric discharge is established between an anode and a point on the film of mercury when used as a cathode it can be arranged that the cathode spot rapidly spread over a substantial area, or even the whole, of the film and remains in this condition so long as the film is maintained, whereby the current density can be made considerably smaller than in known arrangements, and (c) Because the mercury cathode is in the form of a thin film and the current density is reduced, cooling of the cathode is facilitated and temperature conditions can be established under which the cathode member is the coolest part and mercury vapour condenses on the said member to maintain the film and hence the discharge.

Figure 9:
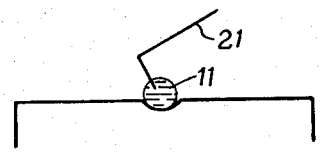
Figure 10:
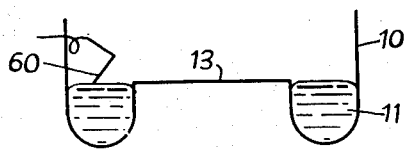
Figure 11:
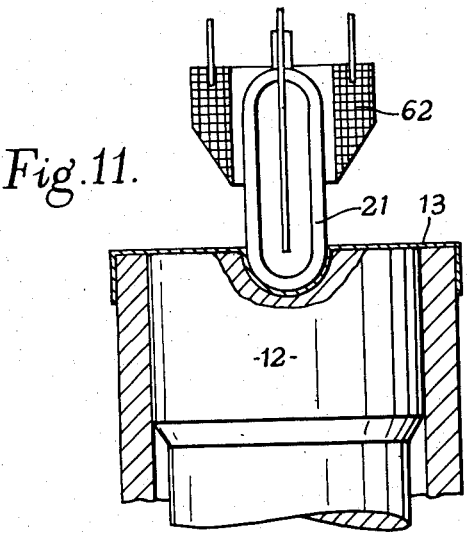
Figure 12:
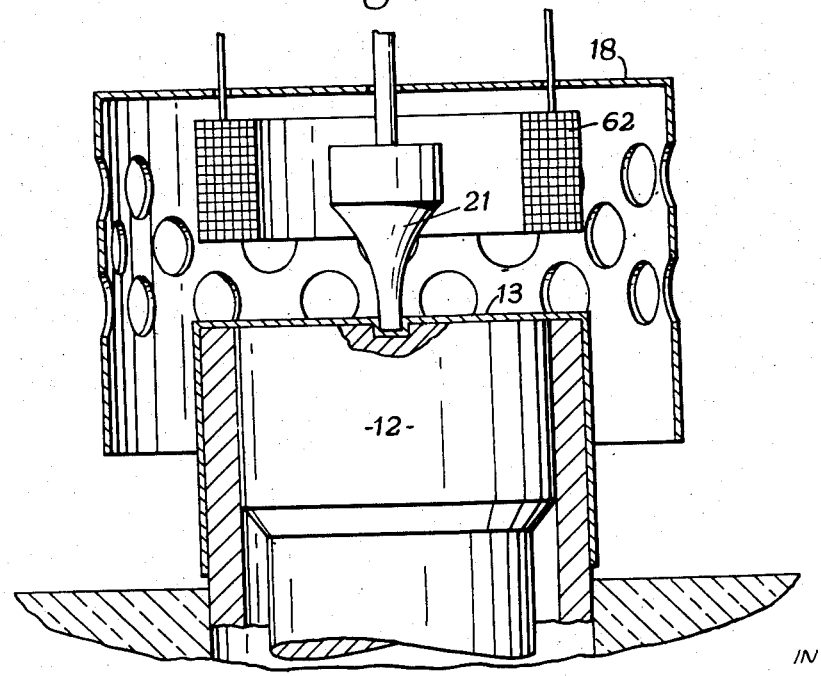

The features of novelty which I desire to protect herein are pointed out with particularity in the appended claims. The invention itself, however, together with further objects and advantages thereof will best be understood by reference to the following specification taken in connection with the accompanying drawings, in which:

FIGURES 1 to 6 are elevations in cross-section of six different embodiments respectively of the invention, FIGURES 7 to 10 are diagrammatic sketches for illustrating the different embodiments of the method according to the invention, FIGURES 11 and 12 show two different starting systems for starting an electric discharge in apparatus according to the invention, and FIGURES 13, 14, 15 and 16 are fragmentary views of parts of embodiments of the present invention employing cathode skirts or surrounds which protect the seals between the glass envelopes and the metal cathode structures.

The embodiment shown in FIG. 1 is suitable for currents of 3 to 10 amps. An envelope 10 of glass has a cup-shaped base containing a pool of mercury 11. A rod 12 of arc-resisting metal such as molybdenum or tungsten is sealed through the base of the envelope and the top 13 of the rod 12 projects above the surface of the pool of mercury. The end 14 of the rod 12 outside the envelope 10 is provided with cooling fins 15. It will usually not be necessary to blow air over the fins 15. Circulation by convection will normally be adequate.

An anode 16 is mounted in the upper part of the envelope 10 and an anode lead-in rod 17 is sealed through the top of the envelope. A control electrode 18 is disposed between the anode 16 and the top surface 13 of the rod 12 and is supported by means of two lead-in rods 19 and 20 which are sealed through the top of the envelope.

A starter electrode 21 is mounted on a spring 22 through which it is connected to a lead-in rod 23 which is sealed through the end of a side arm 24 of the envelope. An electromagnet (not shown) is provided for raising and lowering the starter electrode 21 in conventional manner. The whole of the envelope 10 except the base thereof is shrouded by a shroud 25. During manufacture a film of mercury is formed on the top 13 of the rod 12 as will be described later.

In starting the apparatus shown in FIG. 1 a source of starting potential is connected between the starter electrode and the cathode rod 12 and the starter electrode brought into contact with the film of mercury on the top surface 13 of the rod 12. This initiates the discharge which can be transferred to the anode 16 by the application of a suitable potential to the control electrode 18 in conventional manner.

The discharge spreads rapidly over the whole of the film of mercury on the top 13 of the rod 12.

The shroud 25 is for the purpose of ensuring that the temperature of the envelope 10 is maintained above the saturation temperature of the mercury vapour in the apparatus. The cooling of the mercury film on the top surface 13 of the rod is arranged to be adequate to ensure that the temperature of the film is below the saturation temperature of the mercury vapour and hence mercury vapour condenses on the top surface 13 of the rod 12 thus ensuring the maintenance of the film.

It is usually sufficient to arrange that the temperature of the film on the top of the rod 12 is at least 10° C. less than the temperature of the envelope 10. The temperature of the mercury pool 11 must, of course, lie within the well known limits, dependent upon the voltage to be handled, to ensure correct vapour pressure within the envelope. In the present embodiment the mercury in the pool 11 is heated by the discharge and to facilitate starting it is preferred to preheat the pool.

The use of the shroud 25 is essential in the embodiment shown in FIGURE 1 since without the shroud conditions can readily arise in which the temperature of part of the envelope falls below that of the top surface 13 of the rod 12, and should this occur the condensation of vapour would cease on the surface 13 and interrupt the operation of the apparatus. The control electrode 18 may also be employed as a "keep-alive" electrode.

Referring to FIGURE 2, this is a diagrammatic cross-section of a second embodiment of the invention suitable for use with currents of from 3 to 150 amps and in which the majority of the envelope is constituted by a steel cylinder 16 whose inner surface constitutes the anode. The rod 12 is of copper to provide good heat conductivity and its upper end is metalically-bonded into a steel sleeve 26 which is sealed into a glass cathode insulator 27 which is in turn sealed into a steel sleeve 28 bonded to the lower end of the anode cylinder 16. A cap 13 of arc-resisting metal is formed over the top of the combined rod 12 and sleeve 26. The cap 13 of arc-resisting metal may be formed over the top of the members 12 and 26 in any suitable way, for example as described in the Transactions of the American Electro-Chemical Society, volume 96, 1949, page 389, under the heading "Vapour-Phase Deposition of Refractory Materials."

A ceramic ring 29 surrounds the cap 13 and is spaced therefrom to form an annular-shaped reservoir for the mercury 11. The lead-in rods 19 and 20 for the control electrode 18 are sealed through a glass insulator 30 whose outer periphery is sealed to a steel sleeve 31 which is bonded to the upper end of the anode cylinder 16. A stainless steel cylinder 32 whose upper end is closed is sealed through the centre of the insulator 30 and is surrounded by the winding 33 of an electromagnet. The starter electrode 21 is carried by a rod 34 whose upper end has a soft iron armature 35 fixed thereto. The rod 34 is connected through a spring connection 22 to the closed upper end of the cylinder 32 to provide an electrical connection for applying a starting potential to the starter electrode.

The major part of the anode cylinder is surrounded by a sleeve 36 of metal (such as copper) having good thermal conductivity and cooling fins 37 are affixed thereto or are integral therewith. A central portion of the sleeve 36 extending between the inner ends of the two sleeves 28 and 31 is spaced by a small air gap of a few thousandths of an inch from the anode cylinder 16 whereby the heat transfer from the anode cylinder to the sleeve 36 is normally poor.

During manufacture of the apparatus a thin film of mercury is formed on the cap 13 in a manner to be described later.

In operation, starting is effected by applying a suitable starting potential between the starter electrode and the cathode cap 13 and energising the electromagnet 33 to lift the starter electrode from the mercury film to start the discharge. The discharge spreads rapidly over the film on the cap 13 and can be transferred from the starter electrode to the anode 16 by the application of a suitable potential to the control electrode 18 in conventional manner.

As the gap between the anode cylinder 16 and the sleeve 36 prevents efficient heat transfer to the sleeve 36, cooling of the anode cylinder is inefficient whereby its temperature rises above the saturation temperature and ensures that condensation of vapour takes place only on the cap 13 which is below the saturation temperature. As the temperature of the anode cylinder 16 rises further, the gap between the anode cylinder 16 and the sleeve 36 narrows until contact is made between these two members. The heat transfer then becomes more efficient and prevents overheating of the anode cylinder. Cooling is effected by means of a stream of air directed upwardly over the fins 15 and 37. As in the embodiment of FIGURE 1 the control electrode 18 may be used as a "keep-alive" electrode.

FIGURE 3 shows an air-cooled arrangement with a glass envelope suitable for loads of 30 to 100 amps. The cap 13 of molybdenum has a flange 38 which extends to and is sealed to the lower edge 39 of the envelope 10. The cap 13 is cooled by a block of copper 12 having cooling fins 15 over which a stream of air is blown by any suitable blower (not shown). In this embodiment the glass envelope is not shrouded and in order to ensure that the operation of the apparatus is not upset by the condensation of mercury vapour on the envelope in the vicinity of the discharge the vapour space is restricted by means of a shield 40 extending over the anode 16 and the control electrode 18. The gap between the shield 40 and the wall of the envelope 10 is made small and hence the amount of vapour escaping into the upper part of the envelope is insufficient to have any effect on the operation of the apparatus. The temperature of that part of the envelope extending downwardly from the lower edge of the shield 40 is determined by the discharge, and the temperature of the cap 13 can readily be made sufficiently lower than that of the said part of the envelope 10 to ensure that condensation of mercury vapour takes place on the top surface of the cap 13. Further to ensure the necessary temperature conditions for condensation on the top of the cap 13 a heater 41 is provided for the purpose of heating the upper part of the structure during starting.

The starter electrode is in this embodiment in the form of a hinged flap 21' whose free end is normally in contact with the film of mercury on the top of the cap 13 and which is drawn away from the film of mercury during starting by the electromagnet 33. Baffles 61 are provided to prevent radiation of heat direct from the control electrode 18 and anode 16 on to the cap 13. A "keep-alive" electrode 62 is provided.

FIGURE 4 shows an embodiment of the invention having an air-cooled glass envelope and a water-cooled cathode and is suitable for use with currents of from 50 to 250 amps. The cap 13 of molybdenum is formed over the closed upper end of a steel cylinder 42 which is sealed into the glass envelope. Cooling water or other coolant is fed to the closed upper end of the cylinder 42 through a conduit 43 and after passing over the inner surface of the upper closed end of the cylinder 42 the cooling water passes out through an outlet port 44. The glass envelope is not shrouded and hence the atmosphere surrounding the apparatus is able to cool the glass envelope 10. Condensation of mercury vapour on the top surface of the cap 13 can be ensured by arranging that the temperature of the coolant used for cooling the cathode is sufficiently below the temperature of the air surrounding the envelope to give the required difference in temperature between the envelope and the top surface of the cap 13.

Referring to FIGURE 5, this shows an embodiment of the invention suitable for use with currents of from 100 to 600 amps. The envelope 10 is of steel and has an annular shaped mercury reservoir 45 surrounding an upstanding part 46 which is capped by the molybdenum cap 13. The cathode member is hollow and is cooled by a flow of water up through a central tube 42 to the undersurface of the closed upper end of the hollow cathode member. The water leaves the cathode member through a tube 43 coaxial with the tube 42 and provided with an outlet port 44. The member 43 is shaped as shown in such a manner that the cooling water is prevented from flowing over the lower half of the annular shaped reservoir 45, whereby the temperature of the reservoir is allowed to rise. The starter electrode 21 is as shown in FIGURE 2 and is actuated by the electromagnet 33. In order to permit vertical movement of the rod supporting the starter electrode 21 the upper end of the rod is fixed to metal bellows 46.

The temperature of the envelope is controlled by passing the water flowing from the outlet port 44 of the cathode cooling arrangement through a jacket 47 whenever the temperature of the water in the jacket exceeds a predetermined value determined by a thermostat device shown schematically at 48, this value being such that the temperature of the envelope is above the saturation temperature.

The outlet port 44 is connected through a valve 49 to an inlet port 50 of the jacket 47 and water flowing through the jacket 47 is discharged at an outlet port 50. The valve 49 is normally closed and is opened by the thermostat only when the temperature of the water in the jacket 47 reaches the said predetermined value. The control rod 51 of the valve 49 is also connected to a further valve 52 and it is arranged that when one of the valves 49 and 52 is open the other is closed and when the valve 49 is closed and the valve 52 open the water discharged from the outlet port 44 of the cathode cooling arrangement is discharged through the valve 52.

In this way it is possible to control closely the temperature conditions of the envelope and the cathode to ensure that condensation of the mercury vapour takes place on the cap 13 and not on the envelope 10.

It will be seen from FIGURE 5 that the amount of mercury in the reservoir is reduced to a very small amount. In the embodiment of FIGURE 3 it is possible to reduce the amount of mercury in the reservoir to only a few drops and even one drop of about one cubic centimetre.

The anode 16 is of graphite and the control electrode 18 is in the form of six members of frusto-conical shape arranged one within the other as shown to provide a baffle preventing radiation of heat direct from the anode 16 to the cap 13.

Referring now to FIGURE 6 this shows an embodiment of the invention in which the cathode is cylindrical in shape and comprises a steel cylinder 53 covered internally by a layer 13 of molybdenum or other arc-resisting metal. This cylinder surrounds a further steel cylinder 16 whose inner surface constitutes the anode of the apparatus and the control electrode 18 is disposed in the space between the anode and cathode cylinders. The gaps between the two ends of the cathode cylinder 53 and the corresponding ends of the anode cylinder are sealed by means of two glass seals 54 and 55.

As in the embodiments already described, during manufacture the surface of the arc-resisting metal 13 has a film of mercury formed thereon and the starter electrode 21 is arranged to make contact with the thin film of mercury during starting and to be drawn away from the mercury film by any suitable means (not shown) to establish the discharge. In order to maintain the temperature of the cathode 13 sufficiently below that of the anode 16 and the glass seals 54 and 55 to ensure condensation of mercury vapour on the cathode to maintain the film, a stream of air or cooling liquid such as water is passed through the bore of the anode as shown by the arrow 63 and further is passed over cooling fins 64 attached to the cathode cylinder the direction of movement of the air over the cooling fins being shown by arrows 65, the temperature or rate of movement of the two streams of cooling air being arranged to be such that the required temperature conditions are produced. Furthermore it will be appreciated that the cathode member can be the inner cylinder and the anode member the outer cylinder.

Referring now to FIGURE 7, this is a schematic drawing for showing one method by which a thin film of mercury can be established on a member of arc-resisting metal during manufacture of mercury vapour electric discharge apparatus. The surface on which a film of mercury is to be established is the top surface of a cathode cap 13 of arc-resisting metal such as molybdenum or tungsten. The mercury reservoir is in this example shown to be of annular shape and sufficient mercury 11 is inserted to flood just over the top surface of the cap 13. The envelope 10 is connected to a vacuum pump 56 which is employed initially to evacuate the air from the envelope 10. When this has been effected a flow of cooling liquid is established through the cathode cooling system as indicated by the arrows 57 and 58 and the starter electrode 21 is operated to establish a discharge between the surface of the liquid mercury and the starter electrode and by applying a suitable potential to the control electrode the discharge is transferred to the anode 16. Pumping is continued to remove gases which emanate from the various metals within the envelope and later to extract mercury vapour from the envelope. The mercury vapour so extracted is condensed in a condenser 59. The initial current is kept small, for example 3 or 4 amps.

As mercury vapour is extracted from the envelope 10 the level of the liquid mercury 11 falls until it reaches the top surface of the cathode cap 13. Under the influence of the discharge a small spot on the cap 13 becomes wetted by the mercury. Spreading of the spot is effected by increasing the current gradually, and if required it can be arranged to cover the whole of the top surface of the cap 13. The time taken to wet the whole of the top surface may be from 4 to 12 hours depending upon the area to be wetted. For apparatus to handle 60 amps the cathode cap may have a diameter of about 4 inches and it may require about 8 hours to wet the whole surface. Pumping is continued until the amount of mercury 11 in the annular-shaped reservoir is reduced to the value required. It is essential during the wetting process to keep the temperature of the cap 13, or that part of the cap 13 required to be wetted by the mercury, at a temperature at which condensation of mercury vapour occurs on the cap 13.

Figure 8:
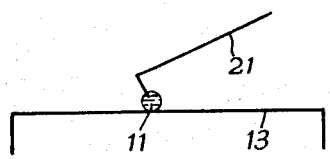

An alternative method is to establish a discharge between a small drop of mercury on the cathode surface to be wetted as shown in FIGURE 8. The extraction of mercury vapour is not then required.

If desired a recess may be provided in the surface to be wetted to accommodate the drop 11 of mercury as shown in FIGURE 9.

FIGURE 10 illustrates yet another method for producing the film of liquid mercury on the surface of the metal 13. Again the cathode is cooled and a discharge is established between an anode electrode on the surface of a pool 11 of mercury which is in contact with member 13. Under the action of the discharge the mercury wets the rim of the member 13 and the wetted area spreads over the top surface of the member 13. The cooling of the member 13 must be such as to ensure that condensation of mercury vapour takes place thereon.

It will be appreciated that the present invention enables the size of mercury vapour electric discharge apparatus employing mercury cathodes to be reduced considerably, and it enables the quantity of mercury in such apparatus to be reduced to a small fraction of that previously required.

In apparatus according to the present invention the discharge is anchored during operation but unlike known methods of anchoring the cathode spot is spread over a surface and is not merely extended along a wetting edge between a pool of mercury and an anchor rod or cup. Some modes of operation of apparatus according to the invention may occur, of course, in which the discharge is anchored to the wetting line between the pool of mercury 11 of say FIGURE 3, and the cap 13, as well as over the top surface of the cap 13.

If it is desired to employ apparatus according to the present invention in vehicles and especially in aircraft, where the apparatus may become tilted and even inverted at times, provided the reservoir of mercury contains only a small quantity of mercury, say one drop, and the design of the apparatus is made such that should the mercury fall out of its normal position it does not short-circuit electrodes or other members which must be insulated from one another, satisfactory operation can be maintained.

In normal use the discharge must always be initiated on the thin film of mercury. Although the more usual methods of starting have been shown and described it will be appreciated that other methods may be employed. For example capacitive starting can be used. In this method of starting, an electrode is spaced from the thin film of liquid by a small gap and a short pulse of voltage is applied thereto to initiate the discharge. This method of starting is known in connection with mercury vapour electric discharge apparatus employing a pool of mercury as a cathode, but it has been observed that the reaction on the starter electrode in an arrangement according to the present invention is substantially less than in known arrangements whereby the life of the starter electrode is longer. This advantage is of substantial importance as the starter electrode is usually the first to need replacement.

Referring to FIGURE 11, this shows a capacitive starting arrangement in which the starter electrode 21 has a domed lower end whose radius of curvature is slightly less than the radius of curvature of a semi-spherical recess in the cap 13. The gap between the domed end of the electrode 21 and the thin film of mercury on the cap 13 is only a small fraction of an inch. The electrode 21 is maintained in the position shown during starting and throughout operation.

Another method of starting is an adaptation of the "Ignitron" method developed by the British Thomson-Houston Company Limited. In this adaptation of the "Ignitron" method a semi-conductor is kept in contact with the mercury film of the cap 13. One example of such apparatus is shown in FIGURE 12, from which it will be seen that the semi-conductor element 21 is tapered and its end of smaller diameter is fitted into a recess in the cap 13.

It will be seen that in the arrangement of FIGURE 11 the starter electrode is closely adjacent the film of mercury on the cap 13 and in the arrangement of FIGURE 12 the starter electrode is in contact with the film of mercury on the cap 13. Thus, in operation, the discharge is initiated direct on the film of mercury and the discharge spreads substantially instantaneously over the wetted area. It is preferred to employ a "keep-alive" electrode 62 (FIGURES 11 and 12) which closely surrounds the starter electrode to ensure ease of ignition and to protect the starter electrode to some extent from the main discharge. The main discharge can be caused to move away from the starter electrode as described in my British patent specification No. 670,417. The life of the starter electrode 21 of FIGURE 12 can be made longer than is usual in conventional "Ignitrons."

Although arrangements have been described in which the top surface of the cathode is flat it will be understood that this surface may be alternatively of convex shape.

Although embodiments of the invention have been described in which the liquid mercury reserve 11 is in direct or metallic contact with the cathode member such contact is not necessary.

Figure 13:
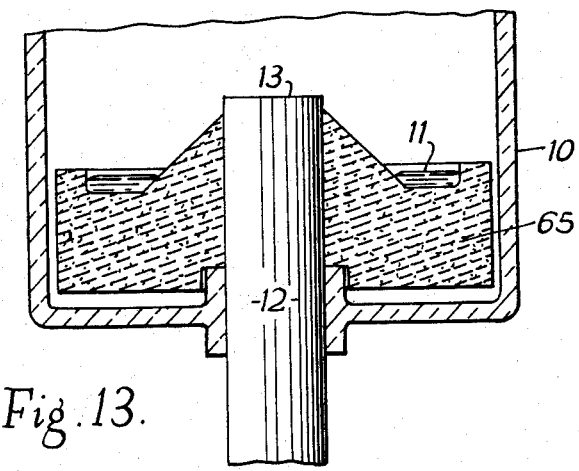

Referring now to FIGURE 13 this is a fragmentary showing of an embodiment of the invention in which the cathode rod 12 is sealed into a glass envelope 10 and is provided with a ceramic surround 65.

The ceramic surround has two functions in this embodiment. Firstly it protects the seal between the envelope 10 and the rod 12 from the action of the discharge which is liable to damage the seal. Secondly it is shaped as shown to provide an annular reservoir for the mercury 11 which is thereby out of metallic contact with the cathode and hence is insulated from the film of mercury on the top of the cathode member.

Another example of the use of ceramic surrounds providing a reservoir for the mercury 11 and protecting the glass-to-metal seals is shown in FIGURE 6 which includes two annular ceramic surrounds 66 and 67. The ceramic surrounds in this embodiment are also shaped to provide reservoirs for the liquid mercury 11 but the mercury can make contact with the cathode member readily if the apparatus is suitably orientated. Nevertheless it is arranged that the mercury cannot bridge the anode-cathode space.

Figure 14:
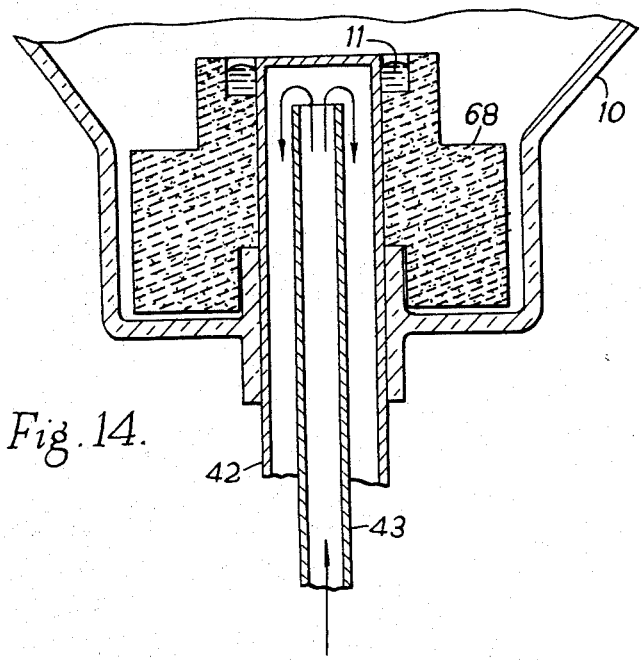

Yet another example of the use of a ceramic surround is shown in FIGURE 14 in which a ceramic skirt 68 surrounds the cathode structure. This skirt protects the seal and provides a reservoir for the liquid mercury 11 closely adjacent and in direct contact with the cathode member.

Figure 15:
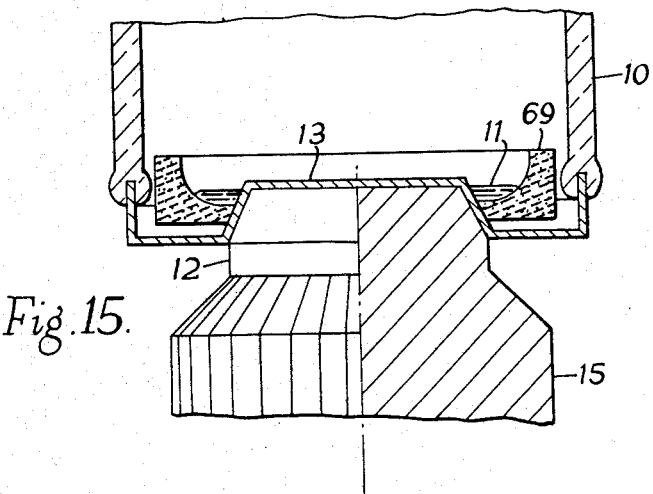

FIGURE 15 shows yet another embodiment employing a ceramic surround 69 for the cathode structure the ceramic surround in this case protecting the glass-to-metal seal and providing an annular channel around the cathode member for containing the spare mercury 11.

Figure 16:
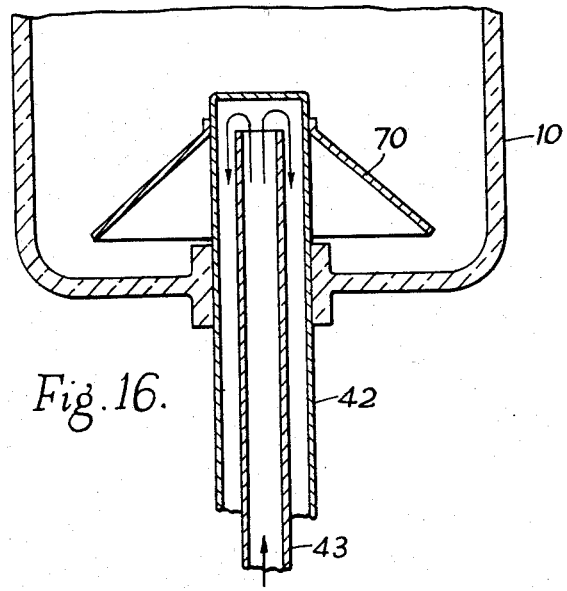

There are even other ways of protecting the glass-to-metal seal from the action of the discharge. One construction successfully employed is shown in FIGURE 16 and comprises a conical metal skirt 70 attached to the cathode member and covering the seal between the cathode and the envelope. The skirt 70 is preferably of molybdenum or nickel.

In the appended claims, the term "solid" as applied to the cathode member is to be interpreted as defining a metallic member which is non-porous to mercury.

I claim:

1. Mercury vapour electric discharge apparatus comprising an envelope containing an anode, a cathode and a mercury vapour atmosphere, said cathode comprising a solid member formed of arc-resisting metal having an arcing area coated with a thin film of liquid mercury, heat-exchange means acting on part of said apparatus for maintaining the coated area of said cathode at a lower temperature than that of said mercury vapour throughout the entire current range of the apparatus, whereby said film of liquid mercury is maintained by condensation of mercury vapour upon said coated area, and means for maintaining the temperature of said envelope above the saturation temperature of the mercury vapour within the envelope.

2. Apparatus according to claim 1 wherein the envelope is of glass and substantially the whole of the envelope is surrounded by a shroud, and wherein said heat-exchange means comprises means for cooling the cathode to a temperature lower than that reached by the envelope during operation by an amount such as to cause condensation of mercury vapour on the said cathode to maintain the said film.

3. Apparatus according to claim 1 wherein the envelope is mainly of steel and its inner surface constitutes the anode.

4. Apparatus according to claim 1 wherein the said heat-exchange means comprise means for cooling the anode relatively inefficiently until the temperature of the anode reaches a predetermined value and for cooling the anode relatively efficiently when the temperature of the anode exceeds the said predetermined value, and further means for maintaining the temperature of the cathode lower than that of the anode by an amount such that condensation of mercury takes place on the cathode to maintain the said film during operation.

5. Apparatus according to claim 4 wherein the cooling means for the anode comprise a sleeve of metal surrounding a part of the anode and spaced therefrom by a small gap adapted to close when the said predetermined temperature is reached.

6. Apparatus according to claim 1 wherein the envelope is of glass and the vapour space is limited by a screen surrounding the anode and grid and spaced from the wall of the envelope by a gap of such small dimensions that the escape of vapour into the upper part of the envelope is substantially prevented.

7. Apparatus according to claim 1 wherein a cooling jacket is provided around a substantial part of the envelope and means to provide that in operation, whenever the temperature of cooling liquid in the jacket exceeds a predetermined value further cooling liquid is circulated therethrough.

8. A cathode as claimed in claim 1 wherein the arc-resisting metal is in the form of a layer over part of a further member of metal.

9. Apparatus according to claim 1 and including a starter electrode normally in contact with the said film, and means operative to break the contact between the film and the starter electrode during starting.

10. In a method of manufacturing a cathode for mercury vapour electric discharge apparatus of the type specified, wherein a solid member of arc-resisting metal is assembled in an envelope together with an anode and a supply of liquid mercury which is in contact with the said member, and the envelope is evacuated of air, the step of establishing an electric discharge between the anode and the mercury, maintaining temperature of at least a part of the surface of the said member within the envelope below the saturation temperature of the mercury vapour produced by the discharge to cause a thin film of mercury to be established on at least a part of the said surface and means for maintaining the temperature of said envelope above the saturation temperature of the mercury vapour within the envelope.

11. Mercury vapour electric discharge apparatus comprising an envelope containing an anode, a cathode and a mercury vapour atmosphere, said envelope comprising a hollow cylinder arranged vertically and having a reentrant portion at the lower end thereof, said cathode being embodied in a circular wall closing the upper end of said reentrant portion and comprising a solid plate-like member of arc-resisting metal having its upper face coated with a thin film of mercury, means forming a cathode cooling chamber in the upper end portion of said reentrant envelope section and occupying only a small part of the space within said reentrant section at the top thereof, means passing cooling fluid through said cathode cooling chamber, a cooling jacket surrounding the outer cylindrical wall of said envelope above the plane of said circular wall, means for passing cooling fluid through said cooling jacket at a higher temperature than the fluid supplied to said cathode cooling chamber, and a small quantity of liquid mercury located in the bottom of the annular space surrounding said reentrant envelope portion.

12. A method of producing a novel electric discharge between a cathode and an anode enclosed within an envelope evacuated of air and containing a reservoir of mercury, said method comprising maintaining said reservoir of liquid mercury at a temperature such as to provide a mercury vapour atmosphere in the envelope, maintaining the envelope at a temperature above the temperature of the liquid mercury and above the saturation temperature of the mercury vapour atmosphere, maintaining said cathode member at a temperature below the temperature of the liquid mercury and below the saturation temperature of the mercury vapour atmosphere, whereby the cathode member is the coolest part of the apparatus, and a discharge is established between the cathode member and the anode member inside the envelope.

13. A mercury vapour electric discharge device, comprising an envelope evacuated of air, an anode member, a cathode member, and a reservoir of liquid mercury within the envelope, the cathode member being provided with cooling means, and the liquid mercury in the reservoir being out of metallic contact with the cathode member.

14. Mercury vapour electric discharge apparatus comprising an envelope containing an anode, a cathode and a mercury vapour atmosphere, said cathode, comprising a solid member formed of arc-resisting metal having an arcing area coated with a thin film of liquid mercury, and heat-exchange means acting on part of said apparatus for maintaining the coated area of said cathode at a lower temperature than that of said mercury vapour through the entire current range of the apparatus, whereby said film of liquid mercury is maintained by condensation of mercury vapour upon said coated area and a reservoir of liquid mercury being provided in the envelope, the mercury in said reservoir being out of metallic contact with the cathode.

15. Mercury vapour electric discharge apparatus comprising an envelope containing an anode, a cathode, a mercury vapour atmosphere and a supply of liquid mercury, said cathode comprising a solid member of arc-resisting metal having an arcing area coated with a thin film of liquid mercury, heat-exchange means acting on said cathode to maintain the temperature of said arcing area below the saturation temperature of the mercury vapour atmosphere, and heat-control means acting on the envelope to maintain the temperature of the envelope above the saturation temperature of the mercury vapour atmosphere.

16. A method of maintaining an electric discharge between an anode member and a thin film of mercury on a cathode member, the anode and cathode members being in an atmosphere of mercury vapour in an envelope evacuated of air, the method consisting in maintaining the temperature of the cathode member below the temperature of the mercury vapour and maintaining the temperature of the envelope above the temperature of the mercury vapour whereby the cathode member is the coolest part of the apparatus.

17. Mercury vapour electric discharge apparatus as claimed in claim 1, wherein the said envelope is of glass and the said solid cathode member is sealed therethrough, and wherein the apparatus includes a member surrounding the cathode and protecting the seal from the action of the discharge.

18. Mercury vapour electric discharge apparatus according to claim 17, wherein the said member surrounding the cathode is a metal shield.

19. Mercury vapour electric discharge apparatus according to claim 17, wherein the said member surrounding the cathode is of ceramic material.

20. Mercury vapour electric discharge apparatus according to claim 19, wherein the ceramic member is shaped to provide a reservoir to hold liquid mercury.

21. Mercury vapour electric discharge apparatus according to claim 1, wherein the anode and cathode are of cylindrical form, one cylinder being inside the other.

22. Mercury vapour electric discharge apparatus according to claim 21, wherein the inner cylinder is the anode and the outer cylinder is provided with cooling fins.

References Cited in the file of this patent

UNITED STATES PATENTS

| | | |
|---|---|---|
| 1,847,646 | Gaudenzi | Mar. 1, 1932 |
| 2,477,506 | Winograd | July 26, 1949 |
| 2,493,659 | Dorgelo | Jan. 3, 1950 |
| 2,594,851 | Bertele | Apr. 29, 1952 |